(12) United States Patent
Kakegawa

(10) Patent No.: US 8,717,593 B2
(45) Date of Patent: May 6, 2014

(54) MAINTAINING SECURITY OF SCANNED DOCUMENTS

(75) Inventor: Ienobu Kakegawa, Franklin Lakes, NJ (US)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 108 days.

(21) Appl. No.: 13/405,520

(22) Filed: Feb. 27, 2012

(65) Prior Publication Data

US 2013/0222836 A1    Aug. 29, 2013

(51) Int. Cl.
*G06F 15/00*    (2006.01)
(52) U.S. Cl.
USPC ...................................................... 358/1.14
(58) Field of Classification Search
USPC ...................................................... 358/1.14
See application file for complete search history.

(56) References Cited

U.S. PATENT DOCUMENTS

2010/0188684 A1*    7/2010    Kumara ..................... 358/1.14

OTHER PUBLICATIONS

U.S. Appl. No. 13/161,921, filed Jun. 16, 2011.
U.S. Appl. No. 13/161,927, filed Jun. 16, 2011.

* cited by examiner

*Primary Examiner* — Saeid Ebrahimi Dehkordy
(74) *Attorney, Agent, or Firm* — Cooper & Dunham LLP

(57) ABSTRACT

A method for maintaining security of scanned documents which monitors read operations and output operations of documents containing proprietary or confidential information. For example, every time it is determined that a scanned document includes proprietary or confidential information, unique identification data corresponding to the read operation is generated and stored in a secured storage unit. The unique identification data can later be used to trace the scanned document and retrieve the information regarding the particular read operation (e.g., user, time, machine used, etc.).

20 Claims, 13 Drawing Sheets

Fig. 12

| USER AUTHENTICATION INFORMATION ||
|---|---|
| User ID | Password |
| John.Smith | WJMv2eYXLL |
| Jane.Doe | yaS6MSk8yR |
| Jim.Carter | sNmy8HCpZf |
| Joe.Black | oYD7h8HFI5 |

Fig. 13

| USER ACCESS INFORMATION |||
|---|---|---|
| User ID | Documents | Department |
| John.Smith | A, C, Y, Z | Legal |
| Jane.Doe | C, D, E | Technical |
| Jim.Carter | A, B | Accounting |
| Joe.Black | A, B, C, D, X, Y, Z | Management |

MAINTAINING SECURITY OF SCANNED DOCUMENTS

TECHNICAL FIELD

This disclosure relates to apparatuses, methodologies and systems for maintaining security of scanned documents, and in particular, an approach wherein identification data is generated for tracing scan operations.

BACKGROUND

In the current information age, information can travel around the globe with a single click of a mouse. The ease with which proprietary, confidential or otherwise sensitive documents can be distributed over the Internet poses a concern for many enterprises and other organizations. There is essentially no limit to how many copies of a single document can be made, and a confidential document that a person holds today can be in the hands of millions tomorrow.

Even if all of the confidential documents are maintained as hard copies, scan functionalities currently provided by scanners and multi-function devices (MFD) allow people to readily generate an electronic version of such a document. The potential misuse of such functionalities can make an organization quite nervous regarding use of such functionalities with the information technology (IT) of the organization. For example, a disgruntled employee of an organization can easily scan a document containing confidential information of the organization and email it to whomever he or she wants.

In order to deal with such a problem, some user authentication is typically required before a user can use the scan functionalities of an IT system, and some organizations allow only a small group of individuals to use scan functionalities. Such organizations can somewhat limit misappropriation or unauthorized distribution of protected information.

However, such control of scan functionalities of an MFD limits utilization of such functionalities and presents an obstacle to potentially enhanced productivity that can be obtained from scan functionalities. For example, if a manager had to approve every scan operation or, even worse, simple forms, which pose no security risk, had to be re-typed every time an electronic version was needed, efficiency and productivity would certainly be reduced. Therefore, limiting access to such functionalities would also detract from productivity.

There remains a need for an improved approach for minimizing illicit transmission of confidential documents.

SUMMARY

This disclosure provides tools (in the form of apparatuses, methodologies and systems) for maintaining security of scanned documents which allow one to deter unauthorized distribution of scanned documents and trace and monitor use of the scan functionality of a scanning device or apparatus.

In an aspect of this disclosure, when a user scans a document using a multi-function device (MFD) having scan functionality, image data and scan operation data, such as data identifying the user requesting the scan operation, time of the scan operation, and machine used for the scan operation, are generated and stored. When output of the image data is requested, it is determined whether the scanned document contains proprietary or confidential information. If it is determined that the scanned document contains proprietary or confidential information, an output image bearing both (i) an image of the scanned document and (ii) the read operation data shown in combination with the image of the scanned document is output.

In another aspect, unique identification data is generated and registered in a secured database for each scanned document that contains proprietary or confidential information. The unique identification data can be used in the event of a data breach to trace the particular document and the corresponding information regarding scan operation.

BRIEF DESCRIPTION OF THE DRAWINGS

The features of the present disclosure can be more readily understood from the following detailed description with reference to the accompanying drawings wherein:

FIG. 12 shows an example of user authentication information;

FIG. 13 shows an example of user access information;

DETAILED DESCRIPTION

Figure 1:
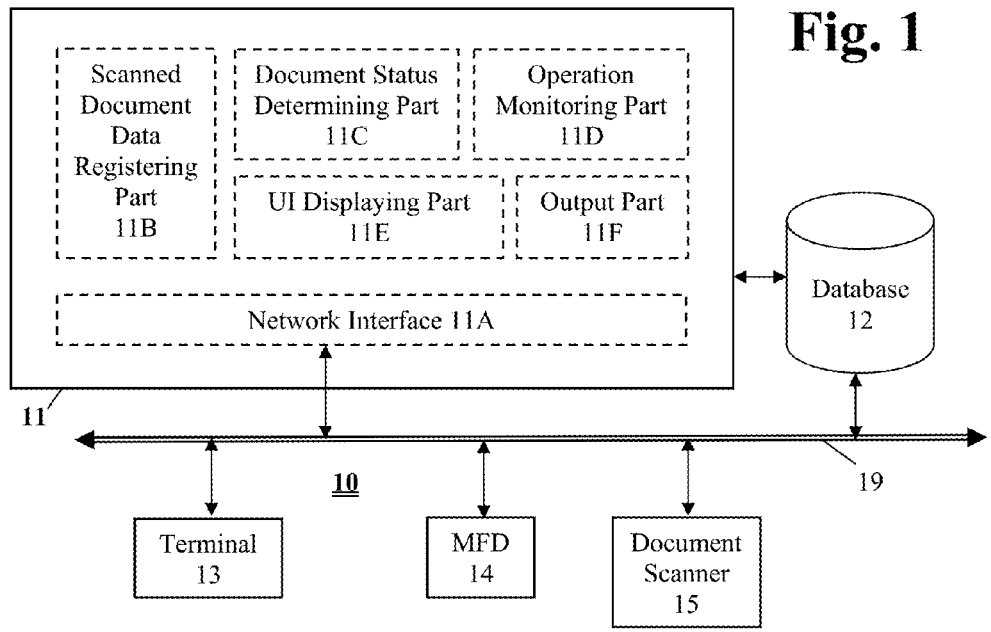
FIG. 1 shows a block diagram of a system, according to an exemplary embodiment.

In describing examples and exemplary embodiments illustrated in the drawings, specific terminology is employed for the sake of clarity. However, this disclosure is not intended to be limited to the specific terminology so selected and it is to be understood that each specific element includes all technical equivalents that operate in a similar manner.

This disclosure deals with the problem of unauthorized distribution of documents containing proprietary or confidential information through the use of scanning devices.

In this disclosure, tools are provided for maintaining security of scanned documents by generating unique identification data that allows tracing of the scanned documents and monitoring the scan functionality and the send functionality of various devices. These functions are performed by various elements in the systems and apparatuses of the exemplary embodiments disclosed in the present disclosure. However, these embodiments are just examples, and one or more of these elements described below can be implemented in a single device or distributed across a network or over a transmission channel, or implemented as hardware or software.

The term "confidential" as used in the present disclosure describes anything that is intended by a person or an organization to be kept secret. The term "proprietary" as used in the present disclosure describes anything that has any competitive or commercial value such as a customer list or a patentable technology.

The phrase "proprietary or confidential information" as used in this disclosure includes any proprietary, confidential, privileged or otherwise sensitive information, such as attorney work product or patient medical history. The phrase "confidential document" as used in this disclosure is any document containing such proprietary or confidential information.

The phrase "read operation" and "scan operation" are used interchangeably in the present disclosure.

Referring now to the drawings, wherein like reference numerals designate identical or corresponding parts throughout the several views, FIG. 1 shows a block diagram of a system 10, according to an exemplary embodiment. The system 10 includes a control unit 11, a database 12, a terminal 13, an MFD 14 and a document scanner 15, all of which are interconnected by a network 19. The control unit 11 includes a network interface 11A for communicating with other devices connected to the network 19, a scanned document data registering part 11B, a document status determining part 11C, an operation monitoring part 11D, a user interface displaying part 11E and an output part 11F.

In this embodiment, the elements such as the control unit 11, the database 12 and the MFD 14 are depicted as separate devices distributed over a network. In another embodiment (e.g., FIG. 3), these elements can be embedded within a single device such as an MFD, as discussed infra with reference to FIG. 3. In such a case, the control unit 11 can also be implemented as software.

The scanned document data registering part 11B receives image data corresponding to a scanned document read in a read operation (i.e. scan operation) by a read apparatus (e.g., MFD 14 or document scanner 15) and registers read operation data indicating (i) user identification of a requesting user requesting the read operation, (ii) a time of the read operation and (iii) device identification of the read apparatus that performed the read operation.

For example, the user identification can include the name, user ID or employee ID of the requesting user. The device identification can include the serial number of the read apparatus or the location of the read apparatus (such as department, room or floor number).

Such read operation data is stored, for example, in a storage located in the read apparatus or the control unit 11, or in a remote location across the network. Preferably, the read operation data is stored in a location other than the document store for storing the image data of scanned documents.

The document status determining part 11C first determines based on the received image data whether the scanned document includes proprietary or confidential information. In a case that the document status determining part 11C determines that the scanned document includes proprietary or confidential information, the document status determining part 11C generates unique identification data corresponding to the read operation and causes the scanned document data registering part 11B to register the unique identification data along with the read operation data in a secured storage unit.

The unique identification data is a unique code that can be used to trace the particular read operation associated with the code. In the event of a data security emergency that requires investigation to trace the source of the problem (e.g., confidential documents distributed illicitly by a corporate employee), the unique identification data can be used to determine who scanned what kind of confidential document and when and where the particular document was scanned. The unique identification data is preferably stored along with the read operation data in a secured storage unit with highly limited access so as to ensure the effectiveness of maintaining the security data. For example, home security systems may alert potential thieves that an alarm will sound upon entry, but they do not reveal where the alarm is located and how the system is implemented, which would compromise the effectiveness of the alarm system. Likewise, to maximize the preventative effect and the tracing and monitoring capabilities, the unique identification data is undisclosed and inaccessible to the requesting user (and basically any other user).

The output part 11F outputs output data, based on the image data and in response to an output request requesting output of the scanned document, to a specified destination. For example, a user can request that the scanned document be sent to a printer, a network drive to which the user has access, or an e-mail address via the Internet. The operation of the output part 11F is further described infra with reference to the example of FIG. 6.

The user interface displaying part 11E displays a user interface to the requesting user and receives user input from the requesting user through the user interface. For example, a user may need to provide login credentials before being granted access to certain functionalities of an MFD. Or, if the user requests that a scanned document be sent to an external location (e.g., an e-mail not having the company domain), the user might receive a warning message through the user interface and be asked to confirm that the operation is desired.

The operation monitoring part 11D monitors operations of the read apparatus (i.e. MFD 14 and document scanned 15) and operations of the output part 11F. In a case that the document status determining part 11C determines that the scanned document requested to be output by the output request includes proprietary or confidential information, the operation monitoring part 11D causes the user interface displaying part 11E to display a warning message through the user interface. For example, the warning message requests confirmation that output of the scanned document that includes proprietary or confidential information is desired by the requesting user. Upon receiving the confirmation through the user interface that the output of the scanned document that includes proprietary or confidential information is desired, the operation monitoring part 11D causes the output part to output the output data for an output image that includes the read operation data shown in combination with an image of the scanned document. The output image is further described infra with reference to the examples of FIGS. 15 and 16.

The operation monitoring part 11D further monitors the operation of read devices and the output part 11F, for example, by checking whether the read operation requested by the user is a potential security risk or whether the specified destination is a secure location. For example, if the user is scanning hundreds of confidential documents, the operation monitoring part 11D may transmit a warning through the network 19 to a network administrator. Or, if a confidential document is requested to be output to an unknown foreign location, the operation monitoring part 11D may cause the user interface displaying part 11E to display a warning message or transmit a warning through the network 19 to the network administrator. Such operations of the operation monitoring part 11D is further discussed infra with reference to the examples of FIGS. 10 and 11.

The database 12 stores, for example, the read operation data, the unique identification data corresponding to the read operation, the output image containing the read operation data and/or other user authentication and access information for authenticating users and determining the scope of the users' document access.

The terminal 13 can be any computing device, including but not limited to a personal, notebook or workstation computer, a kiosk, a PDA (personal digital assistant), a mobile phone or handset, another information terminal, etc., that can communicate with other printing devices through the network 19. Although only one user terminal is shown in FIG. 1, it should be understood that the system 10 can include a plurality of user terminal devices (which can have similar or different configurations). The terminal 13 is further described infra with reference to the example of FIG. 4.

The system 10 includes one or more components having scanning functionality, such as the MFD 14 and the document scanner 15. The scanning functionality provided by such devices is conventional, unless otherwise discussed herein, and a detailed description of such conventional aspects is omitted in the interest of clarity and brevity. The MFD 14 is further described infra with reference to the example of FIG. 5.

The network 19 can be a local area network, a wide area network or any type of network such as an intranet, an extranet (for example, to provide controlled access to external users, for example through the Internet), the Internet, etc., or a combination thereof. Further, other communications links (such as a virtual private network, a wireless link, etc.) may be used as well for the network 19. In addition, the network 19 preferably uses TCP/IP (Transmission Control Protocol/Internet Protocol), but other protocols can also be used. How devices can connect to and communicate over the network 19 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 2:
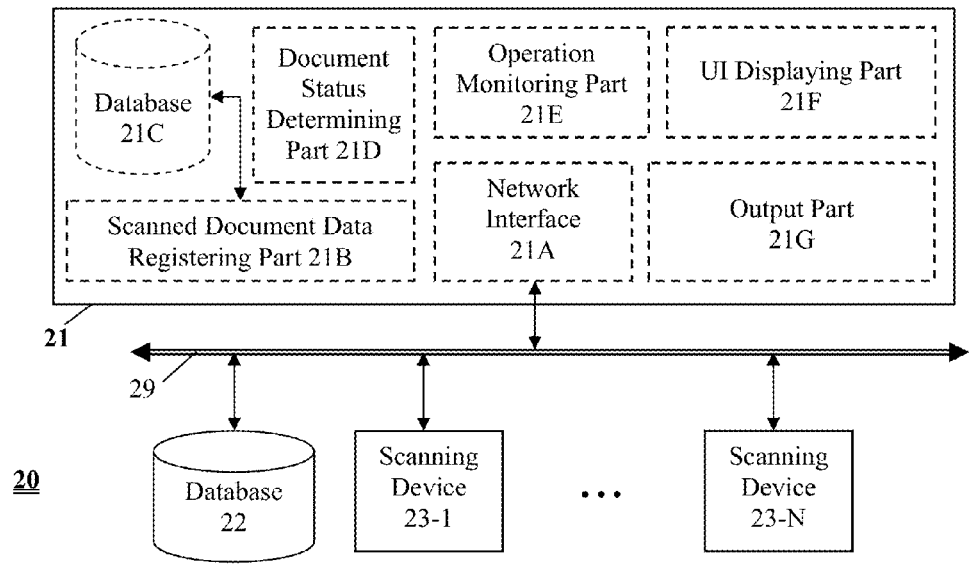
FIG. 2 shows a block diagram of a system, according to another exemplary embodiment.

FIG. 2 shows a block diagram of a system 20, according to another exemplary embodiment.

System 20 includes control unit 21, database 22, scanning devices 23-1 through 23-N, all of which are interconnected by network 29. The control unit 21 includes network interface 21A, scanned document data registering part 21B, database 21C, document status determining part 21D, operation monitoring part 21E, user interface displaying part 21F and output part 21G.

Figure 10A:
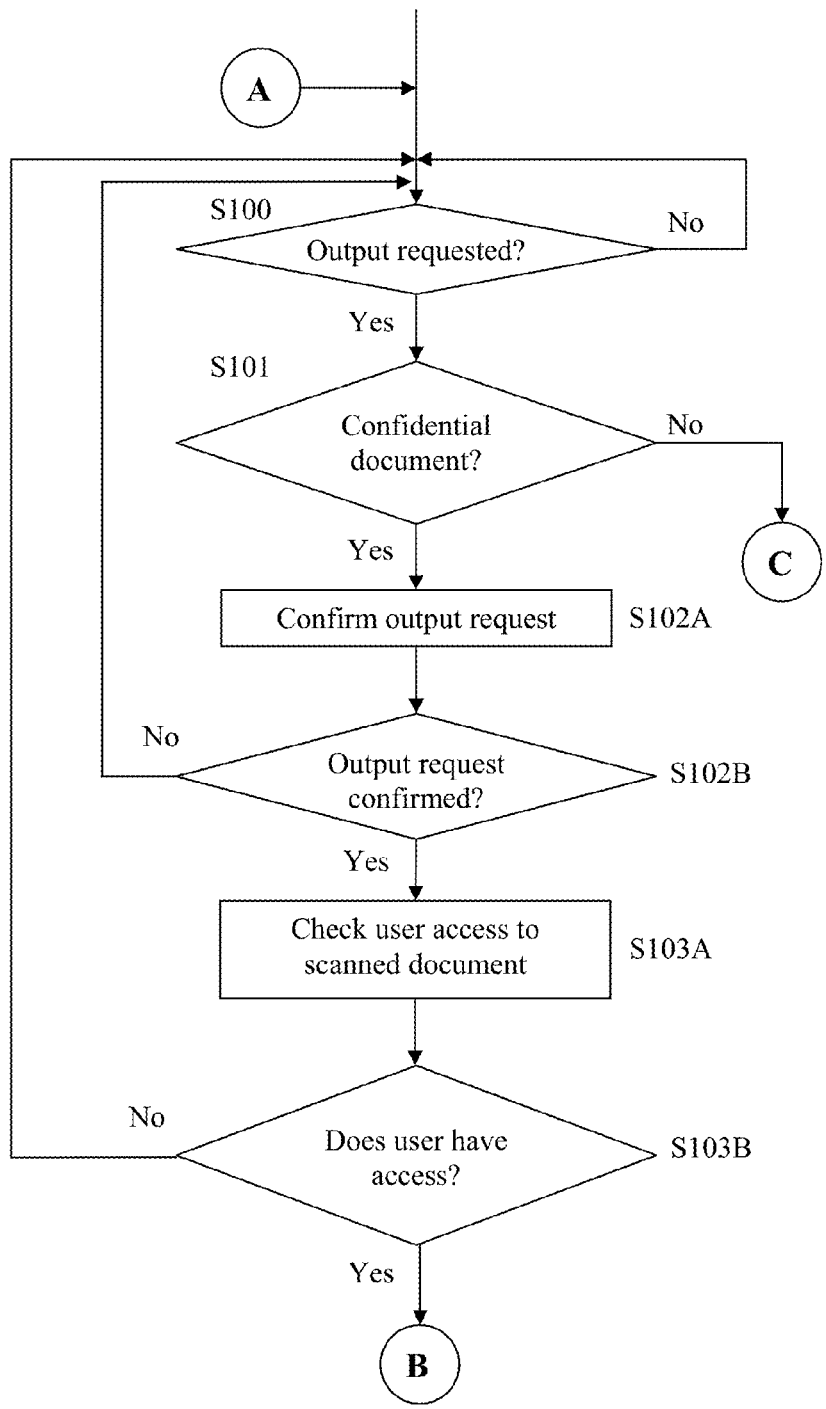
FIGS. 10A and 10B show a flow chart for a method for outputting a document, in an exemplary embodiment.
Figure 10B:
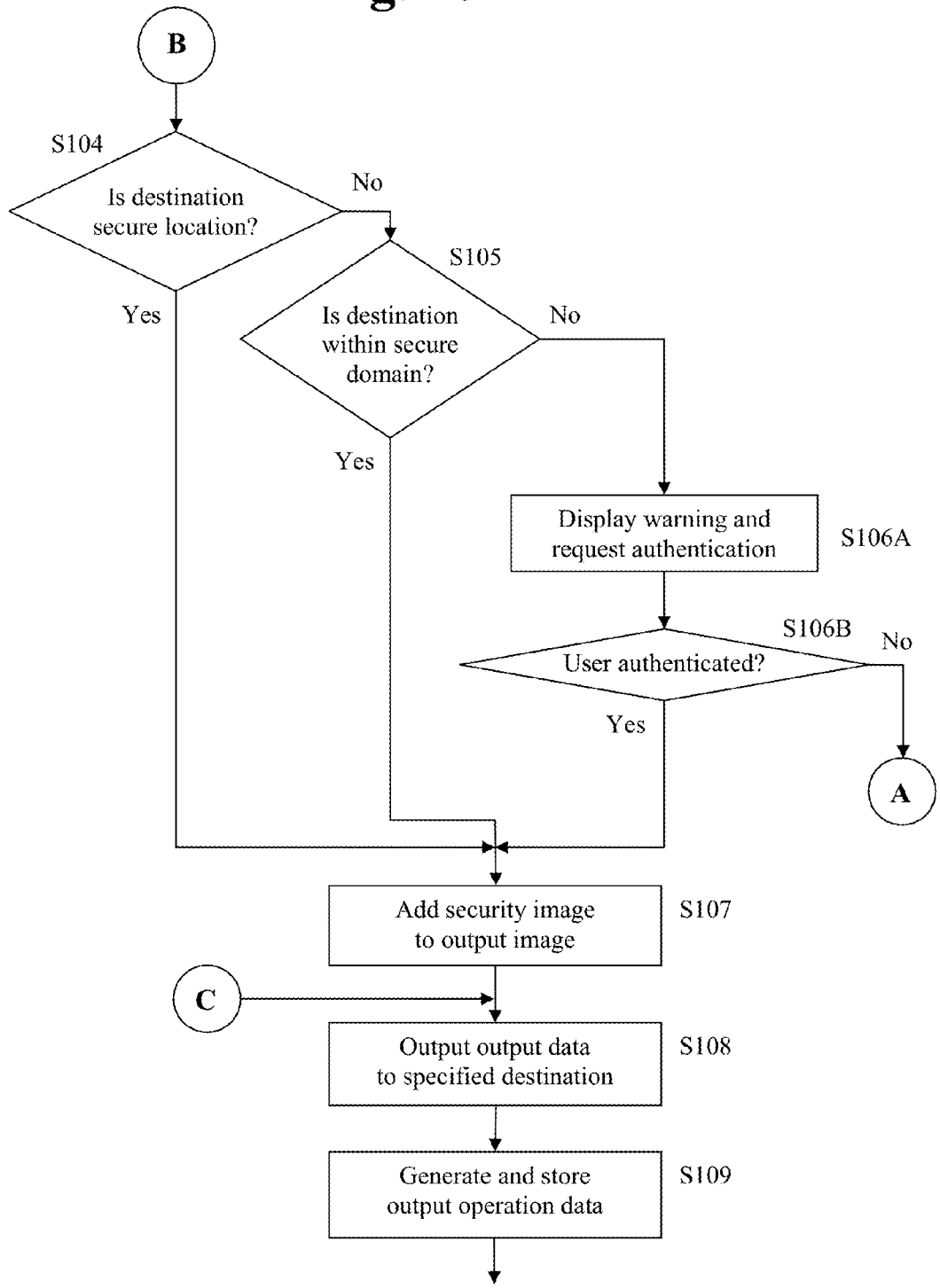

The secured database 21C is configured to store unique identification data generated by the document status determining part 21B, preferably along with the read operation data (and output operation data, which is further described with reference to the example of FIG. 10). Access to the secure database 21C is preferably highly limited, with the access being granted to only a select few, the unique identification data preferably being retrieved from the secure database 21C only in the event of a data security emergency.

Otherwise, the system 20 operates in a similar manner as discussed with reference to the example of FIG. 1.

Figure 3:
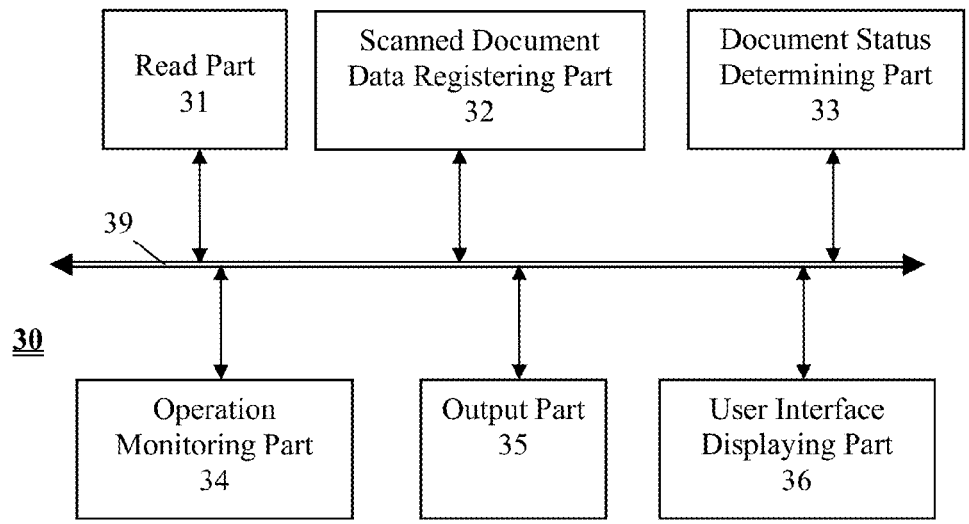
FIG. 3 shows a block diagram of an apparatus for maintaining security of scanned documents, according to an exemplary embodiment.

An apparatus for maintaining security of scanned documents according to an exemplary embodiment is described below in connection with FIG. 3. The scanned document security maintaining apparatus 30 includes a read part 31, a scanned document data registering part 32, a document status determining part 33, an operation monitoring part 34, an output part 35 and a user interface displaying part 36, all of which are interconnected by an internal bus 39.

The read part 31 is configured to read a document and generated image data corresponding to the read document.

The output part 35 is configured to output output data, based on the image data generated by the read part 31 and in response to an output request requesting output of the scanned document, to a specified destination. For example, the method of outputting the output data can include e-mailing, transferring over the network or via the Internet, saving to a local disk or sending to a printing device for printing.

The scanned document data registering part 32, the document status determining part 33 and the operation monitoring part 34 operate in a similar manner as described in connection with FIG. 1.

Figure 4:
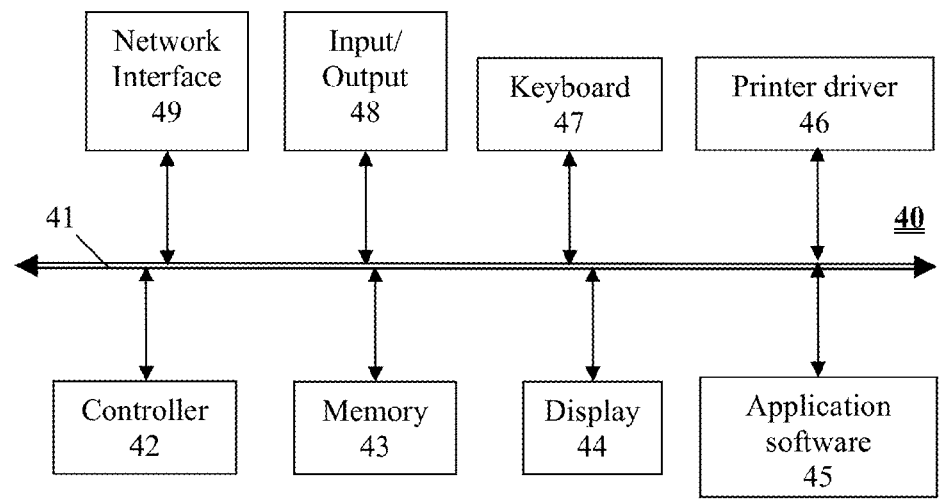
FIG. 4 shows a block diagram of an exemplary configuration of a terminal shown in FIG. 1.

An example of a configuration of the user terminal 13 of FIG. 1 (for example, as a computer) is shown schematically in FIG. 4. In FIG. 4, computer 40 includes a controller (or central processing unit) 42 that communicates with a number of other components, including memory 43, display 44, keyboard (and/or keypad) 47, other input/output (such as mouse, touchpad, stylus, microphone and/or speaker with voice/speech interface and/or recognition software, etc.) 48, network interface 49, print driver 46 and application software 45, by way of an internal bus 41.

The memory 43 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 49 provides a connection (for example, by way of an Ethernet connection or other network connection which supports any desired network protocol such as, but not limited to TCP/IP, IPX, IPX/SPX, or NetBEUI) to network 21.

Print driver 46 and application software 45 are shown as components connected to the internal bus 41, but in practice are typically stored in storage media such as a hard disk or portable media, and/or received through the network 19, and loaded into memory 43 as the need arises.

The computer/terminal 40 may be configured (such as through the print driver 46 or application 45) to have a plurality of print modes, such as PDL mode, image mode, etc. In the PDL mode, the terminal communicates a print job to the printing device by utilizing a page description language (PDL) (for example, PostScript, etc.) and including one or more commands (for example, PCL, PJL, etc.), in a format which can be processed by the printing device. In image mode, the information terminal converts the print job into bitmap data and transmits the bitmap data to the printer device. In any event, the print job is communicated from the terminal via one or more packets through the network. Each packet includes in its header the network address (for example, IP address, Mac address, etc.) of the sending terminal.

Additional aspects or components of the computer 40 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J.

Derfler, Jr. and Les Freed (Que Corporation 2000), the entire contents of each of which are incorporated herein by reference.

A multi-function device (MFD) which includes scanning and printing functions (and additionally can serve as a user terminal for entering, saving and accessing electronic data) will be discussed below with reference to the example of FIG. 5.

Figure 5:
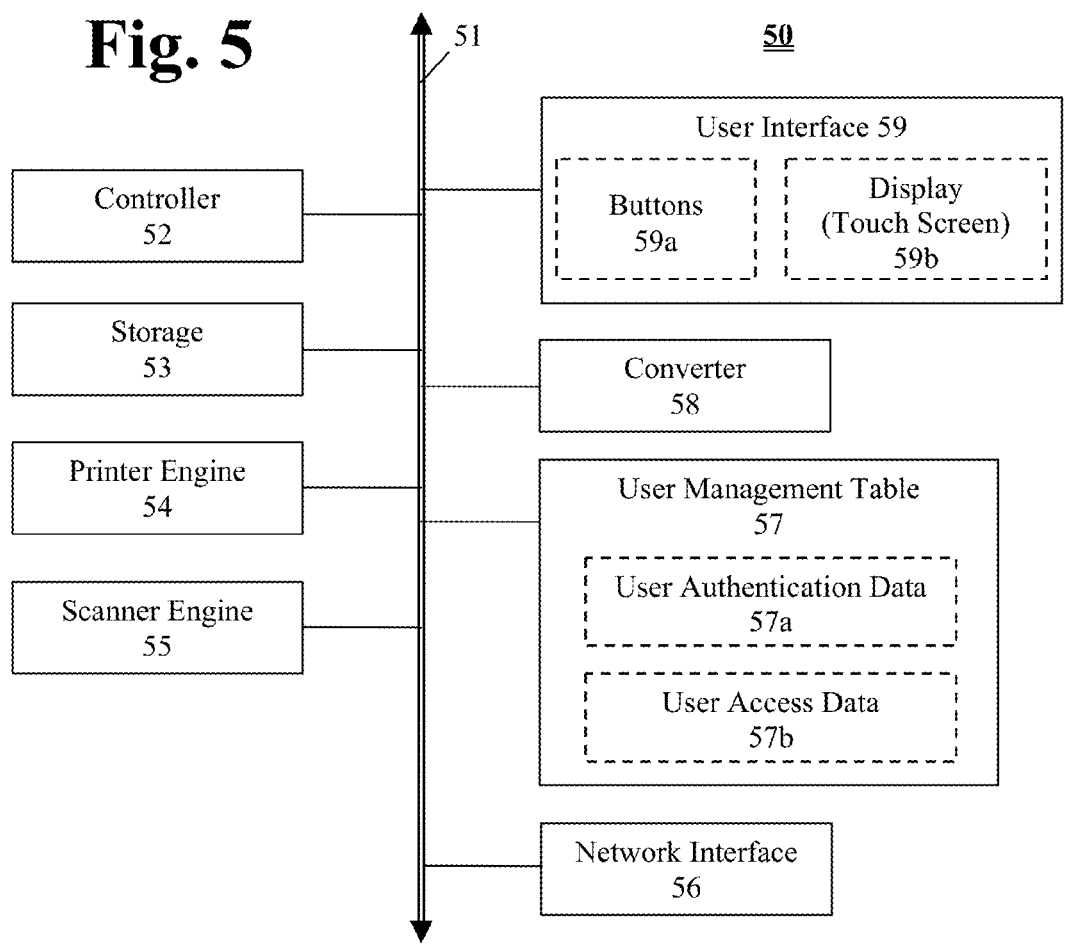
FIG. 5 shows a block diagram of a multi-function device (MFD) which can serve as a user terminal and/or as a database, according to an exemplary embodiment.

FIG. 5 shows an example of the MFD 14 of FIG. 1, which includes scanning and printing functions, and additionally can serve as a user terminal for entering, saving and accessing electronic data or documents. In addition, an MFD can include a resident database. Although the database 12 and terminal 13 are shown in FIG. 1 as distinct components, it should be understood that such components can be resident within an MFD device.

MFD apparatus 50 shown in FIG. 5 includes a controller 52, and various elements connected to the controller 52 by an internal bus 51. The controller 52 controls and monitors operations of the MFD 50. The elements connected to the controller 52 include storage 53 (for example, random access memory, read-only memory, hard disk drive, portable storage media drive such as for optical discs, magnetic discs, magneto-optical discs, etc., semiconductor memory cards, combinations of storage media, etc.), printer engine 54, scanner engine 55, network interface (I/F) 56, converter 58 for converting data from one format to another format (for example, a format suitable for printing, faxing, e-mailing, etc.), and user interface 59. The controller 52 also utilizes information stored in user management table 57 to authenticate the user and control user access to the functionalities of the MFD.

Storage 53 can include one or more storage parts or devices, and program code instructions can be stored in one or more parts or devices of storage 53 and executed by the controller 52 to carry out the instructions. Such instructions can include instructions for performing specified functions (such as printing, scanning, faxing, copying, e-mailing, etc.) of the MFD, to enable the MFD to interact with a terminal, as well as perhaps other external devices, through the network interface 56, and to control the converter 58, access data in the user management table 57, and interactions with users through the user interface 59.

The user interface 59 includes one or more display screens that display, under control of controller 52, information allowing the user of the MFD 50 to interact with the MFD. The display screen can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFD, so as to allow the operator to interact conveniently with services provided on the MFD, or with the MFD serving as terminal for accessing electronic data or other content through the network. For example, a browser (such as Internet Explorer™, Netscape Navigator™, a proprietary browser, etc.) may be provided on the MFD so that the operator can use browsing operations to access the database 12 in the system 10. As another example, the operator can scan a document, and use the browser to upload the image data from scanning of the document (and specify additional information associated with the image) to the database 12.

The display screen does not need to be integral with, or embedded in, a housing of the MFD, but may simply be coupled to the MFD by either a wire or a wireless connection. The user interface 59 may include keys and/or buttons (such as graphical keys or buttons, or other graphical elements, of a GUI on a touchscreen display) for inputting information or requesting various operations. Alternatively, the user interface 59 and the display screen may be operated by a keyboard, a mouse, a remote control, voice recognition, or eye-movement tracking, or a combination thereof.

Since the MFD 50 is typically shared by a number of users, and is typically stationed in a common area, the MFD preferably prompts the user to supply user credential or authentication information, such as user name (or other user or group information), password, access code, etc. The user credential or authentication information can be compared to data stored in the user management table 57 (e.g. user authentication data 57a) to confirm that the user is authorized to use the MFD. The user credential or authentication information may also be stored for the session and automatically supplied if access to other devices through the network requires it. On the other hand, such other devices may prompt the user to supply other user credential or authentication information through the user interface.

Other methods of authentication may also be used. For example, the multi-function device may be equipped with a card reader or one or more biometrics means (such as comparing fingerprints, palm prints, voice or speech, retinas or irises, facial expressions or features, signature, etc.).

Printer engine 54, scanner engine 55 and network interface 56 are otherwise conventional, and therefore, a detailed description of such conventional aspects is omitted in the interest of clarity and brevity.

The MFD 50 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

With reference to the example of FIG. 6, the output part 11F of FIG. 1 is further described below.

Figure 6:
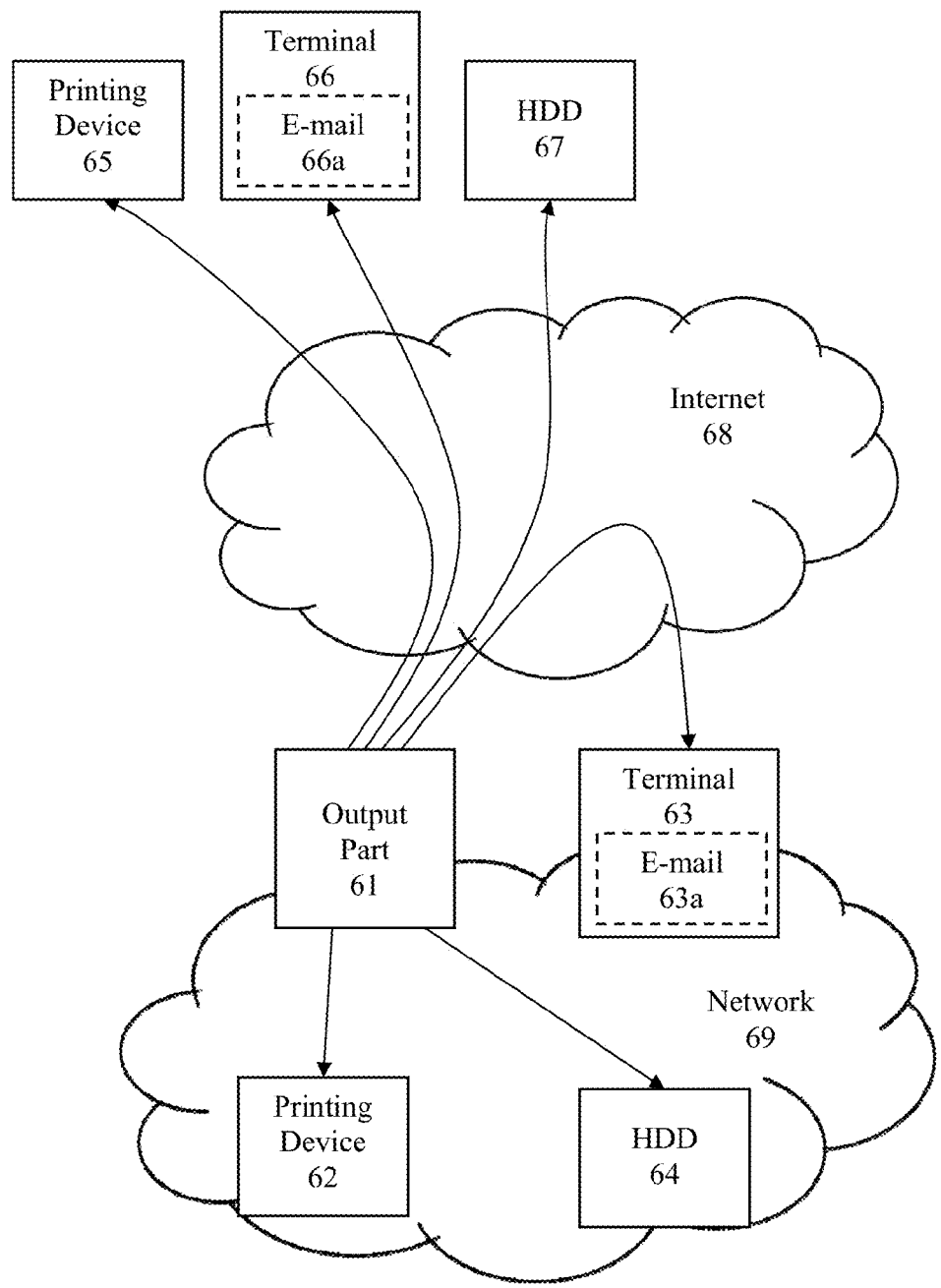
FIG. 6 shows a block diagram illustrating the output operation of the output part in an exemplary embodiment.

In the example of FIG. 6, the output part 61 is connected to a printing device 62, a terminal 63 and an HDD (Hard Disk Drive) 64 via a network 69. FIG. 6 also shows a printing device 65, a terminal 66 and an HDD 67, all of which are outside of the network 69. As discussed in connection with the system 10 of FIG. 1, the output part 11F outputs output data to a specified destination. The specified destination to which the output data is output can be the printing device 62 or the HDD 64 through the network 69. In addition, the output data can be output, via the Internet 68, to the terminal 63 (by sending the output data to an e-mail address 63a), the printing device 65, the terminal 66 (by sending the output data to an e-mail address 66a) or the HDD 67.

Some methods which can be used with the systems of FIGS. 1 and 2 and the apparatus of FIG. 3, for example, are described below.

For example, a method for maintaining security of scanned documents is discussed below with reference to the examples of FIGS. 7 through 17. The method is described in connection with the exemplary configuration shown in FIG. 3. However, the method can also be implemented in other forms including those shown in FIGS. 1 and 2.

First, as a pre-condition to access to the multi-function device (MFD) to scan a document, a user will need to be authenticated. For example, the user can enter his or her login credentials, and if the entered login credentials are properly authenticated, the user is allowed to use the functionalities of the MFD. If the login credentials provided by the user are not properly authenticated, the user will be asked to re-enter his or her login credentials before the user can proceed to access the functionalities of the MFD.

Although the user management table 57 in the example of FIG. 5 stores user ID and password information (e.g., in user authentication data 57*a*), and such information can be used for user authentication, other techniques for authenticating the user, as discussed above in connection with the MFD 50, can be used as well. For example, user authentication can entail the user swiping an access card through a card reader, with such access card including user identification information, to enable the multi-function device to identify and authenticate the user. As another example, one or more biometrics means (such as comparing fingerprints, palm prints, voice or speech, retinas or irises, facial expressions or features, signature, etc.) may be used.

After the user has been authenticated to use the scan functionality of the MFD, the user can proceed to scan a document. If a request to scan a document is received by the MFD, the document is scanned, and image data is generated and stored, for example, in a storage unit located in the MFD. Further, read operation data, which includes, however is not limited to, user identification of the user currently logged in and requesting the read operation, the time of the read operation and device identification of the device or apparatus that performed the read operation, is also stored in the storage unit.

For example, as discussed in connection with FIG. 1, the user identification can include the user ID of the user, the name of the user or the employee ID of the user. The device identification can include the serial number of the MFD or the location of the MFD (such as department, room or floor number).

Such read operation data is preferably stored in a separate location (e.g., in a remote location through the network) other than the document store in which the image data may be stored.

Figure 7:
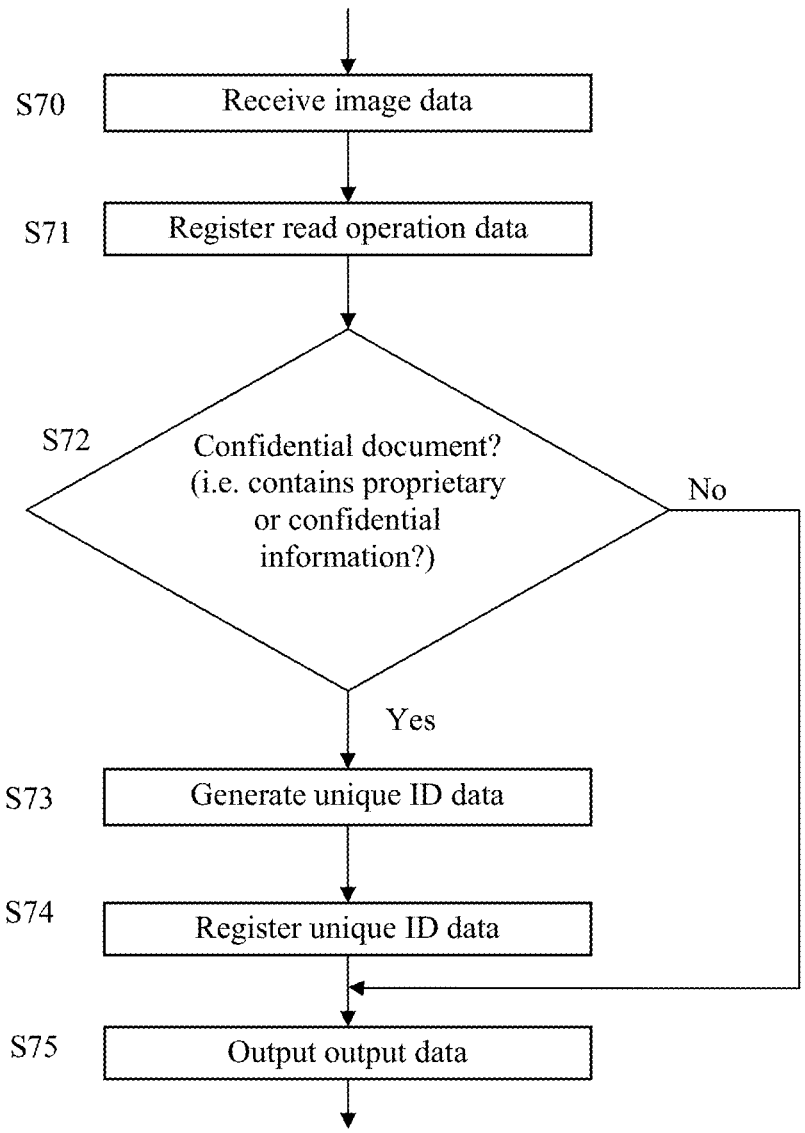
FIG. 7 shows a flow chart for a method for maintaining security of scanned documents, in an exemplary embodiment.

A method for generating security data will now be described with reference to the example of FIG. 7.

After a document has been scanned and the corresponding image data and read operation information have been generated and registered (steps S80 and S81), it is checked whether the scanned document contains any proprietary or confidential information (step S82).

A method for determining whether a scanned document contains proprietary or confidential information (step S82 of FIG. 7) will now be described with reference to the example of FIG. 8.

First, the image data previously generated and stored is loaded (step S80), and OCR (Optical Character Recognition) is performed on the loaded image data to create a text from the image data (step S81). The created text is parsed and searched for proprietary or confidential information (step S82).

Although OCR is used in this example, other image processing techniques such as image recognition (e.g., that used in Google's image recognition search tool) can be used to process the information found in the image data.

To determine whether the parsed text (or otherwise processed image data) contains any proprietary or confidential information, the pieces of data found in the parsed text are, for example, compared to a library of indicators that signal the presence of proprietary or confidential information. Such indicators can include an image or document tagged with a watermark or security code (e.g. "CONFIDENTIAL" written across the document), a particular title (e.g., "Technical Specification of Upcoming Product") or a general pattern of information commonly deemed to be proprietary or confidential information in the particular environment. For example, at a food or beverage manufacturing company, any information resembling the form of a recipe can be considered proprietary or confidential information. At a chip design company, a diagram resembling an integrated circuit (IC) layout or a schematic circuit diagram can be considered proprietary or confidential information. The library of indicators of proprietary or confidential information can be updated and tweaked by system administrators for optimal performance. Further, the library can also include what is typically not proprietary or confidential information. For example, if the scanned document is a map of New York City or the crossword puzzle section of the New York Times, such a document can easily be identified as not being a confidential document.

To compare the data elements in the parsed text or processed image data and the indicators of proprietary or confidential information, conventional image recognition technologies such as OCR technology and/or pattern matching (such as those conventionally used for preventing photocopying of currency) or pattern recognition algorithms can be used.

If proprietary or confidential information is found in the scanned document (step S83, YES), the document is determined to be a confidential document (step S84). If proprietary or confidential information is not found in the scanned document (step S83, NO), the document is determined not to be a confidential document (step S85).

A method for determining whether a scanned document contains proprietary or confidential information (step S82 of FIG. 7) will now be described with reference to the example of FIG. 9.

First, the user ID provided by the user in S61 of FIG. 6 is retrieved (step S100). Then, a user access table (example shown in FIG. 13), maintained either in a local storage (e.g. user access data 57*b* of FIG. 5) or through the network, is accessed (step S101). From the use access table, the scope of the user's access to documents is determined using, for example, the user ID previously retrieved during the authentication process.

Although the user authentication table of FIG. 12 and the user access table of FIG. 13 are shown to be separate tables, the information in the tables could easily be combined in one table with additional columns. Although FIG. 13 lists all the documents to which each user has access, the user access table of FIG. 13 can instead list directories or categories of documents to which each user has access.

Figure 8:
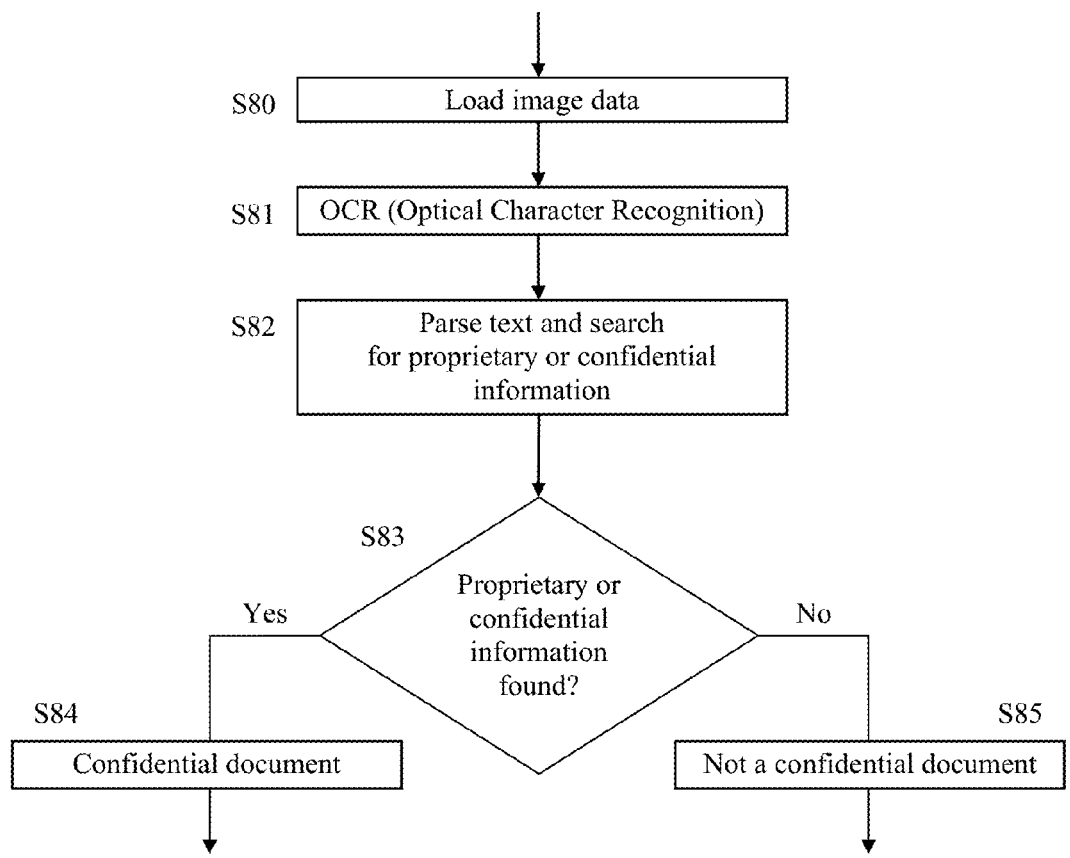
FIG. 8 shows a flow chart for a method for determining whether a document is a confidential document, in an exemplary embodiment.

In the example of FIG. 8, whether the document is a confidential document can be determined based on the documents that the user is permitted to access. For example, if the user has access to a network drive that contains the top secrets of the company, the document the user is scanning can be determined to be a confidential document based on that information. The logic is that since the user has access to confidential documents, the document he or she just scanned could be a confidential document. Or, if the user access table indicates that the user has access to a file containing the customer list of the company, the document can be determined to be a confidential document.

Alternatively, the determination can also be made based on the department to which the user belongs (e.g., IT department, management, etc.). For example, if the members of the security maintenance department at a company are in charge of managing confidential documents, and the user belongs to the security maintenance department, the document that the user is scanning can be determined to be a confidential document based on that information. Or, if the user is in the accounting department and has access to confidential information about the financial matters of the company, the document can be deemed to be a confidential document.

If it is determined that the user has access to confidential documents (step S93, YES), the document is determined to be a confidential document (step S94). If it is determined that the use does not have access to confidential documents (step S93, NO), the document is determined not to be a confidential document (step S95).

In sum, under this method, a scanned document is deemed a confidential document if the user scanning the document has access to any confidential document. This method is preferably used in combination with other methods for determining whether a scanned document contains proprietary or confidential information.

Figure 9:
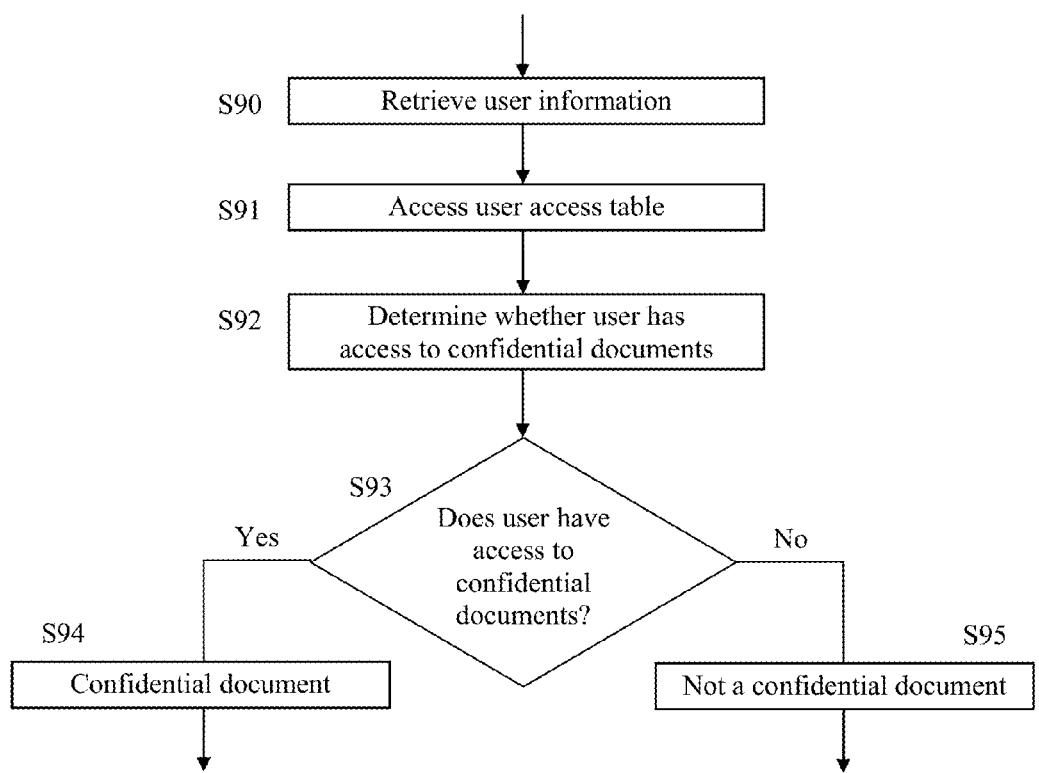
FIG. 9 shows a flow chart for a method for determining whether a document is a confidential document, in another exemplary embodiment.

For example, if the method of FIG. 9 determines that the scanned document is a confidential document, the scanned document can further be examined under the method of FIG. 8 to verify that the scanned document contains proprietary or confidential information, whereas if the method of FIG. 9 determines that the scanned document is not a confidential document (i.e. the user does not have access to any confidential documents), the scanned document is further analyzed to eliminate the possibility that the user illicitly obtained the scanned document.

The method of determining whether a document is a confidential document is not limited to the aforementioned methods or the combination thereof, and other methods can be used.

Referring back to FIG. 8, if it is determined that the scanned document contains proprietary or confidential information (step S82, YES), unique identification data corresponding to the read operation is generated (step S83). The unique identification data can be used to trace the particular read operation associated with the unique identification data. Thus, in the event of a data security emergency that requires investigation to trace the source of the problem, the unique identification data can be used to determine who scanned what kind of confidential document and when and where the particular document was scanned.

The unique identification data can consist of a unique code that is assigned to every read operation of a scanned document containing proprietary or confidential information. It could also be encrypted information linking the user and the confidential document scanned by the user.

Conventionally, scanned images have meta-data associated with it, such as date of creation, user, file size, etc. Such data is available for the user to see. In contrast, the unique identification data corresponding to the scanned document is stored away in a secured database before the scanned image is output to the user for use. While the user still sees the meta-data that may be generated in connection with the read operation (e.g., user ID, date, machine ID, etc.), and the user may be aware that the read operation is being monitored, the user does not get to see all of the security measures taking place (i.e. the unique identification data).

The unique identification data is preferably stored in a secured database with very few people having access to the database. Preferably, the unique identification data need be accessed only in the event of an emergency such as a data breach, in order to trace the source of the problem.

After registering the unique identification data in the secured database (step S84), the output data is output to a specified destination (step S85).

Likewise, if the scanned document is determined not to be a confidential document (step S82, NO), the output data is simply output to a specified destination without generating and registering unique identification data (step S85).

A method for outputting (i.e. sending) a scanned document, will now be described with reference to the example of FIG. 10.

First, it is checked whether an output operation is requested (step S100). For example, the user can request that the scanned document be sent to the user's hard drive via the network, to an internal (within the network or domain) recipient via email or to an external (outside the network or domain) recipient via email. In addition, the user or the MFD can have a default destination to which scanned documents are sent in the event that the user does not specify a destination.

If the output operation is requested (step S100, YES), it is then checked whether the document requested to be sent is a confidential document (step S101). If it has previously been determined (in S72 of FIG. 7) that the document contains proprietary or confidential information (i.e., a confidential document) (step S101, YES), a confirmation message is displayed to the user through a user interface, similar to one shown in FIG. 16, requesting confirmation to proceed from the user (step S102A). If the user does not confirm the output operation, the output operation is terminated (step S102A, NO).

If the output operation is confirmed by the user (step S102B, YES), then it is further checked whether the user has access to the scanned document by accessing the user access table (step S103A). If it is determined that the user does not have access to the scanned document, the output operation is terminated (step S103B, NO).

If the user does have access to the scanned document (step S103B, YES), it is further determined whether the specified destination is a secure location (step S104). A secure location can include, for example, hard drives or e-mails addresses of recipients who already have access to the scanned document according to the user access table, email addresses that are on the safe-list, or destinations within the local network.

If it is determined that the specified destination is not a secure location (step S104, NO), it is further checked whether the specified destination is within a secure domain (step S105). For example, such a destination would include email addresses having the official company domain name (e.g., @ricoh-usa.com).

Figure 17:
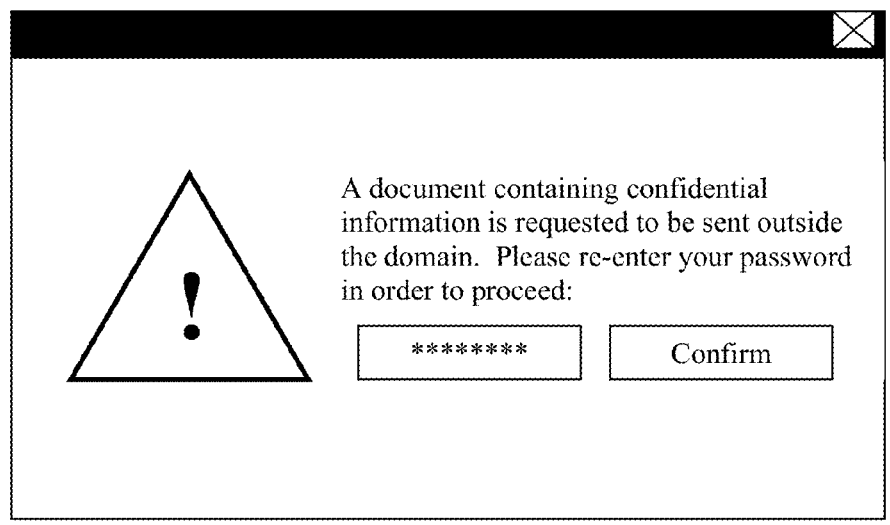
FIG. 17 shows an example of a password re-entry screen.

If it is further determined that the specified destination is not within a secure domain (step S105, NO), a warning message is displayed to the user through the user interface, and the user is requested to provide authentication information (step S106A). An exemplary warning message is shown in FIG. 17. Here, the warning message is intended to remind the user of the consequences of the output operation requested by the user. For example, the user may be unaware that the confidential document is about to be output, by default, to an external recipient. Or, the user may have inadvertently specified the wrong recipient. For example, the MFD would display, "Confidential_Document.pdf containing proprietary or confidential information is about to be sent to an external recipient ('Michael.Jackson@aol.com'). Please re-enter your password in order to proceed: _____."

In another embodiment, a notification email is sent to the IT department and/or the system administrator, notifying them that a scanned document containing proprietary or confidential information is being sent to an external recipient. Such feature would allow the IT department or system administrator to monitor the output operations in real-time for suspicious activities.

If the user is authenticated (step S106B, YES), or if the specified destination is determined to be a secure location (step S104, YES) or within a secure domain (step S105, YES), a security image is added to the output data to be output to the specified destination, such that an output image corresponding to the output data includes the security image shown in combination with an image of the scanned document (step S107).

The security image contains information regarding the read operation performed by the MFD. As discussed above in connection with the read operation performed by the MFD, the information generated includes, for example, user identification of the user, the time of the read operation and device identification of the MFD that performed the read operation.

Figure 14:
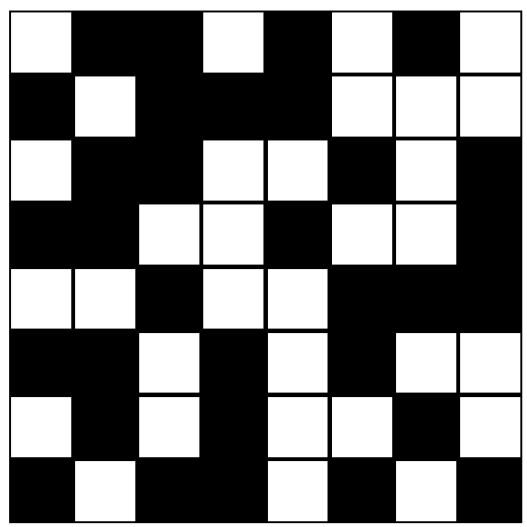
FIG. 14 shows an example of a security image.
Figure 15:
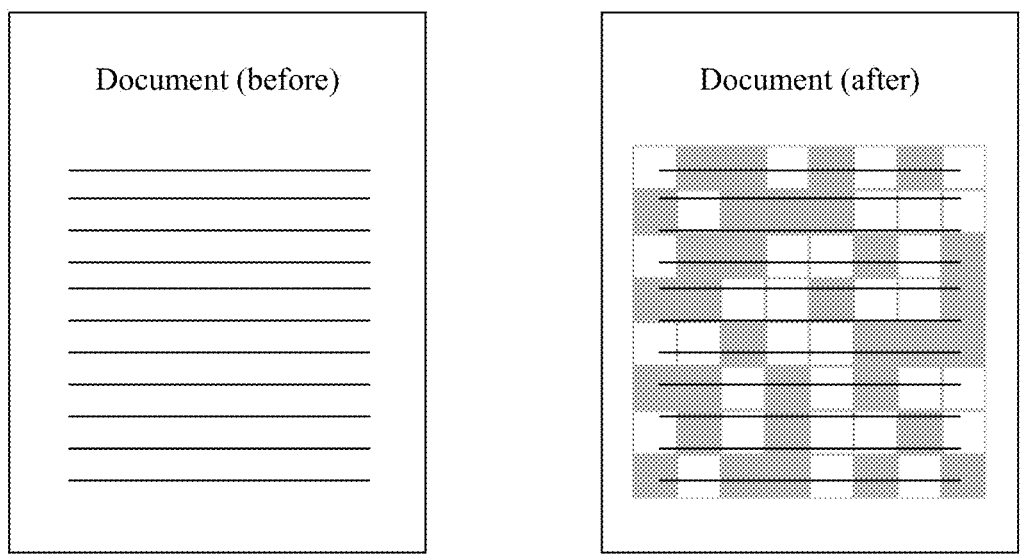
FIG. 15 shows an example of a document containing the security image of FIG. 14.
Figure 16:
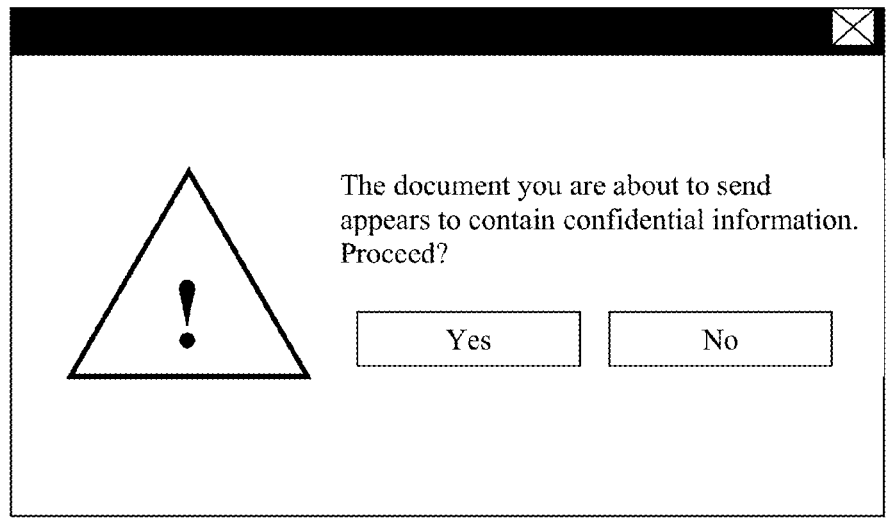
FIG. 16 shows an example of a warning message.

In an embodiment, the security image is preferably designed such that it is illegible to, or indecipherable by, a human being. For example, as shown in FIG. 14, the security image can be a dot matrix containing the read operation data. Preferably, if the MFD printer is black and white or if the read operation was performed in black and white, the security image will be composed of gray dots. On the other hand, if the read operation was performed in color, the security image will be composed of yellow dots, which is hardly visible to a human eye. FIG. 15 shows two documents, one before the security image was added thereto, and one after. Although the security image is made to be visible in FIG. 15 to illustrate an exemplary position of the security image, preferably, the security image would be hardly noticeable. In FIG. 15, the dot matrix of FIG. 14 was added to the document in light gray dots. In addition, the security image could also be in the form of a watermark, barcode, etc.

After the security image is added to the output data, the output data is output to the specified destination (step S108).

Likewise, in the event that the document is not a confidential document (step S101, NO), the output data for an output image containing only the image of the scanned document (i.e. without the security image) is output to the specified destination (step S108).

After the output data has been output, the output operation data is generated and stored in a storage unit that is maintained locally or through the network (step S109). For example, the output operation data includes user identification of the user requesting the output operation, the time of the output operation and device identification of the apparatus that performed the output operation. Preferably, the output operation data is stored at a location separate from the document store in which the image data for scanned documents is stored.

Figure 11:
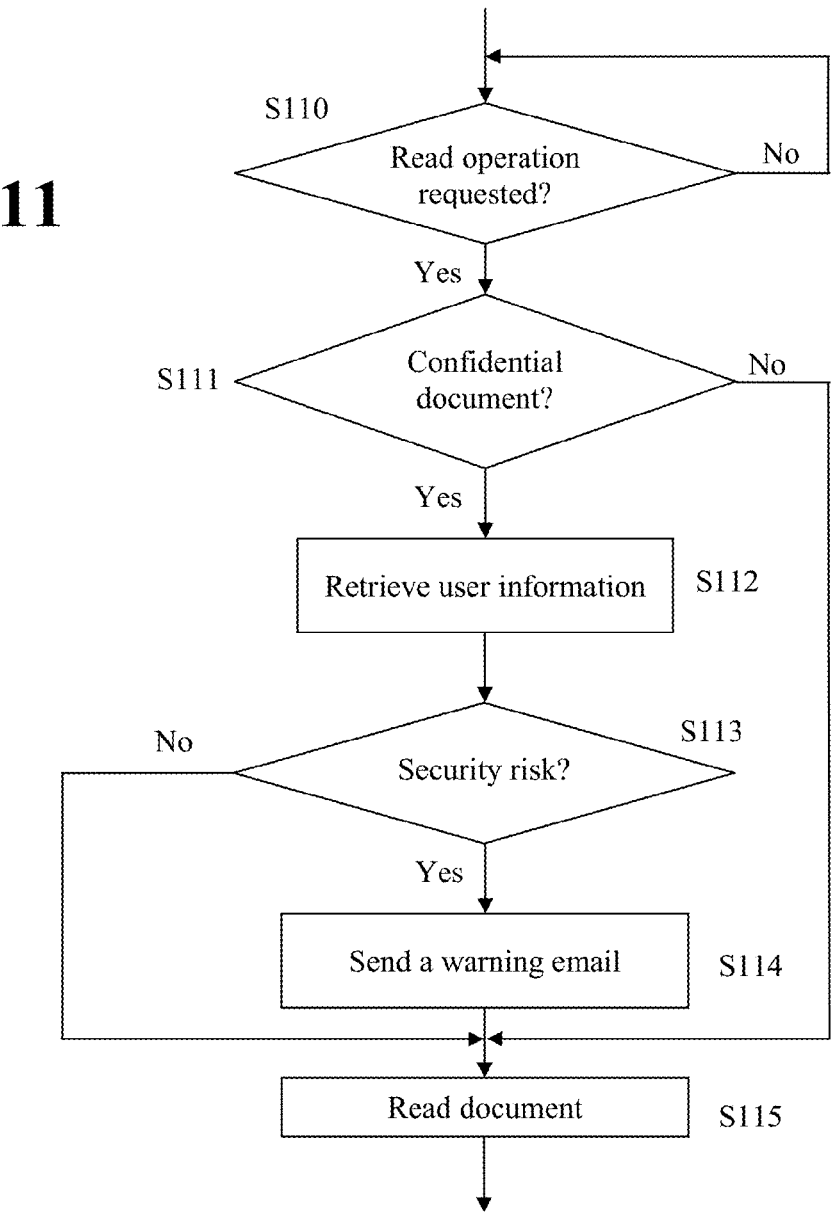
FIG. 11 shows a flow chart for a method for performing a precautionary procedure, in an exemplary embodiment.

A method for monitoring the read operation of the MFD will now be described with reference to the example of FIG. 11.

When the user wants to scan a document (step S110, YES), it is determined whether the document is a confidential document, in a manner similar to that discussed in connection with S72 of FIG. 7. If the document is determined to be a confidential document (step S111, YES), the user information is retrieved from the database storing the read operation (step S112). Then, it is determined whether the current read operation by the particular user poses a security risk (step S113). This determination can be made based on many factors such as, for example, how many documents (or confidential documents) the user has scanned in the past, how many documents (or confidential documents) the user has scanned in the past hour, or even the fact that the user is an employee who only has a week left at the company can be a factor. Various other considerations can be added at the discretion of the system administrator.

If it is determined that there is no security risk (step S113, NO), the document is scanned as requested (step S115). If it is determined that the particular scanning operation requested by the user poses a security risk (step S113, YES), the MFD will, for example, send an email to the IT department or the system administrator to notify them of the security risk (step S114). Other precautionary steps can be taken, such as, for example, logging the suspicious activity in a file stored in the MFD or another database through the network.

The above-mentioned embodiments and examples are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. An apparatus for maintaining security of scanned documents, said apparatus comprising:
    a scanned document data registering part that receives image data corresponding to a scanned document read in a read operation by a read apparatus and registers read operation data indicating (i) user identification of a requesting user requesting the read operation, (ii) a time of the read operation and (iii) device identification of the read apparatus that performed the read operation;
    an access information database that registers, for each user amongst plural users, user access information indicating documents accessible by the specific user;
    a document status determining part that determines based on at least one of (i) the received image data and (ii) the user access information obtained from the access information database whether the scanned document includes proprietary or confidential information, and in a case that the document status determining part determines that the scanned document includes proprietary or confidential information, generates unique identification data corresponding to the read operation, and causes the scanned document data registering part to register the unique identification data along with the read operation data in a secured storage unit;
    an output part that outputs output data, based on the image data and in response to an output request requesting output of the scanned document, to a specified destination;
    a user interface displaying part that displays a user interface to the requesting user and receives user input from the requesting user through the user interface; and
    an operation monitoring part that monitors operations of the read apparatus and operations of the output part,
    wherein in a case that the document status determining part determines that the scanned document requested to be output by the output request includes proprietary or confidential information, the operation monitoring part causes the user interface displaying part to display a warning message through the user interface, the warning message requesting confirmation that output of the scanned document that includes proprietary or confidential information is desired, and upon receiving the confirmation through the user interface that the output of the scanned document that includes proprietary or confidential information is desired, causes the output part to output the output data for an output image that includes the read operation data shown in combination with an image of the scanned document.

2. The apparatus as claimed in claim 1, wherein in a case that the output part outputs the output data for the output image that includes the read operation data shown in combination with the image of the scanned document, the operation monitoring part causes the read operation data to be included in the output image in a manner that is illegible to, or indecipherable by, a human being.

3. The apparatus as claimed in claim 1, wherein in a case that the output part outputs the output data for the output image that includes the read operation data shown in combination with the image of the scanned document, the operation monitoring part causes the read operation data to be included in the output image in a manner of a dot matrix.

4. The apparatus as claimed in claim 1, wherein in a case that the operation monitoring part determines that a number of scanned documents read by the read apparatus within a predetermined period of time exceeds a predetermined number, the operation monitoring part causes an alarm message to be transmitted to a predetermined administrator address.

5. The apparatus as claimed in claim 1, wherein the operation monitoring part determines whether the spec fied destination to which the output data for the scanned document is requested to be output by the output request is a secured location, and in a case that the operation monitoring part determines that the specified destination is a secured location, the operation monitoring part causes the user interface displaying part not to display the warning message through the user interface.

6. The apparatus as claimed in claim 1, wherein the operation monitoring part determines whether the specified destination to which the output data for the scanned document is to be output is within a secure domain of the read apparatus, and in a case that the operation monitoring part determines that the specified destination is not within the secure domain of the read apparatus, causes the user interface displaying part to display the warning message through the user interface, and in a case that the operation monitoring part determines that the specified destination is within the secure domain of the read apparatus, causes the user interface displaying part not to display the warning message through the user interface.

7. The apparatus as claimed in claim 1,
wherein the operation monitoring part determines, based on the user access information stored in the access fo ation database, whether the scanned document requested to be output by the output request is included in the documents accessible by the requesting user, and in a case that the operation monitoring part determines that the scanned document requested by the output request is included in the documents accessible by the requesting user, the operation monitoring part permits the output data to be output by the output part.

8. The apparatus as claimed in claim 1, wherein in the case that the document status determining part determines that the scanned document requested to be output by the output request includes proprietary or confidential information, the operation monitoring part causes the user interface displaying part to display an authentication message through the user interface, the authentication message requesting user authentication information, and causes the output data to be output by the output part only after the user authentication information is verified.

9. The apparatus as claimed in claim 1, further comprising an operations data database that stores output operation data corresponding to output operation by the output part to output the output data for the scanned document to the specified destination, the output operation data indicating (i) the user identification of the requesting user requesting the output operation, (ii) a time of the output operation, and (iii) device identification of an output apparatus that performed the output operation.

10. A system that is configured for maintaining security of scanned documents, comprising:
one or more document read devices, each document read device being configured to perform a read operation in response to request of a requesting user to scan a document and generate and output image data of the scanned document, and generate and output read operation data indicating (i) user identification of the requesting user requesting the read operation, (ii) a time of the read operation and (iii) device identification identifying the document read device;
a scanned document data registering part that receives the image data of the scanned document read in the read operation by said one or more document read devices and registers the read operation data generated by said one or more document read devices;
an access information database that registers, for each user amongst plural users, user access information indicating documents accessible by the specific user;
a document status determining part that determines based on at least one of (i) the received image data and (ii) the user access information obtained from the access information database whether the scanned document includes proprietary or confidential information, and in a case that the document status determining part determines that the scanned document includes proprietary or confidential information, generates unique identification data corresponding to the read operation and causes the scanned document data registering part to register the unique identification data along with the read operation data in a secured storage unit;
an output part that outputs output data, based on the image data and in response to an output request requesting output of the scanned document, to a specified destination;
a user interface displaying part that displays a user interface to the requesting user and receives user input from the requesting user through the user interface; and
an operation monitoring part that monitors operations of said one or more document read devices and operations of the output part,
wherein in a case that the document status determining part determines that the scanned document requested to be output by the output request includes proprietary or confidential information, the operation monitoring part causes the user interface displaying part to display a warning message through the user interface, the warning message requiring confirmation that output of the scanned document that includes proprietary or confidential information is desired, and upon receiving the confirmation through the user interface that the output of the scanned document that includes proprietary or confidential information is desired, causes the output part to output the output data for an output image that includes the read operation data shown in combination with an image of the scanned document.

11. The system as claimed in claim 10, wherein the operation monitoring part is connected to the document read device through a network, and monitors the operations of the document read device through the network.

12. The system as claimed in claim 10, wherein the operation monitoring part is connected to the document read device through a network, to monitor the operations of the document read device, and in a case that the operation monitoring part determines that a number of scanned documents read by the document read device within a predetermined period of time exceeds a predetermined number, the operation monitoring part causes an alarm message to be transmitted through the network to a predetermined administrator address.

13. The system as claimed in claim 10, wherein the operation monitoring part determines whether the specified destination to which the output data for the scanned document is to be output is within a secure domain of the document read device, and in a case that the operation monitoring part determines that the specified destination is not within the secure domain of the document read device, causes the user interface displaying part to display the warning message through the user interface, and in a case that the operation monitoring part determines that the specified destination is within the secure domain of the document read device, causes the user interface displaying part not to display the warning message through the user interface.

14. The system as claimed in claim 10, further comprising an operations data database connected to the document read device through a network, wherein the operation monitoring part causes output operation data corresponding to output operation by the output part to output the output data for the scanned document to the specified destination, to be stored by the operations data database, the output operation data indicating (i) the user identification of the requesting user requesting the output operation, (ii) a time of the output operation, and (iii) device identification of an output apparatus that performed the output operation.

15. A method for maintaining security of scanned documents, said method comprising the steps of:
  (a) receiving image data corresponding to a scanned document read in a read operation by a read apparatus;
  (b) registering read operation data indicating (i) user identification of a requesting user requesting the read operation, (ii) a time of the read operation and (iii) device dentification of a read device that performed the read operation;
  (b1) obtaining, from an access information database that registers, for each specific user amongst plural users user access information indicating documents accessible by the specific user, the user access information of the requesting user;
  (c) determining based on at least one of the received image data and the user access information obtained in (b1) from the access information database, whether the scanned document includes proprietary or confidential information;
  (d) generating, in a case that the scanned document is determined to include proprietary or confidential information in (c), unique identification data corresponding to the read operation and registering the unique identification data along with the read operation data in a secured storage unit;
  (e) receiving an output request requesting output of the scanned document to a specified destination;
  (f) displaying a warning message through a user interface, in a case that the scanned document requested to be output by the output request includes proprietary or confidential information, the warning message requesting confirmation that output of the scanned document that includes proprietary and confidential information is desired; and
  (g) outputting, upon receiving the confirmation through the user interface that the output of the scanned document that includes proprietary or confidential information is desired, output data for an output image that includes the read operation data shown in combination with an image of the scanned document.

16. The method as claimed in claim 15, further comprising:
causing, in a case that output data for the output image that includes the read operation data shown in combination with the image of the scanned document is output, the read operation data to be included in the output image in a manner that is illegible to, or indecipherable by, a human being.

17. The method as claimed in claim 15, further comprising:
determining whether the scanned document requested by the output request is included in the information accessible by the requesting user; and
permitting, in a case that the scanned document requested by the output request is included in the information accessible by the requesting user, the output data to be output to the specified destination.

18. The method as claimed in claim 15, further comprising:
determining that the specified destination is outside a secure domain;
displaying through the user interface a warning message requesting confirmation that output of the scanned document to the specified destination outside the secure domain is desired;
receiving the confirmation through the user interface that the output of the scanned document to the specified destination outside the secure domain is desired; and
causing the output data for the scanned document to be output to the specified destination outside the secure domain.

19. The method as claimed in claim 15, further comprising:
determining that the specified destination is outside a secure domain;
displaying through the user interface a warning message requesting user authentication information to confirm that output of the scanned document to the specified destination outside the secure domain is desired;
receiving the user authentication information through the user interface; and
causing the output data for the scanned document to be output to the specified destination outside the secure domain.

20. The method as claimed in claim 15, further comprising:
generating output operation data corresponding to an output operation of outputting the output data for the scanned document to the specified destination, the output operation data indicating (i) the user identification of the requesting user requesting the output operation, (ii) a time of the output operation, and (iii) device information of an output apparatus that performed the output operation.

* * * * *